United States Patent
Xiao et al.

(10) Patent No.: US 11,682,787 B2
(45) Date of Patent: Jun. 20, 2023

(54) LITHIUM BATTERY INCLUDING COMPOSITE PARTICLES WITH FLAME RETARDANT MATERIAL CARRIED BY PARTICULATE HOST MATERIAL

(71) Applicant: GM GLOBAL TECHNOLOGY OPERATIONS LLC, Detroit, MI (US)

(72) Inventors: Xingcheng Xiao, Troy, MI (US); Mei Cai, Bloomfield Hills, MI (US); Sherman H. Zeng, Troy, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 212 days.

(21) Appl. No.: 17/128,905

(22) Filed: Dec. 21, 2020

(65) Prior Publication Data

US 2022/0200039 A1    Jun. 23, 2022

(51) Int. Cl.
*H01M 10/0525* (2010.01)
*H01M 4/36* (2006.01)
(Continued)

(52) U.S. Cl.
CPC ....... *H01M 10/0525* (2013.01); *H01M 4/366* (2013.01); *H01M 50/414* (2021.01);
(Continued)

(58) Field of Classification Search
CPC ............. H01M 50/414; H01M 50/491; H01M 50/446; H01M 50/46; H01M 4/366
(Continued)

(56) References Cited

U.S. PATENT DOCUMENTS

| 8,309,240 B1 * | 11/2012 | Li ..................... H01M 10/0525 |
| | | 429/57 |
| 8,974,946 B2 | 3/2015 | Cai et al. |

(Continued)

FOREIGN PATENT DOCUMENTS

| CN | 104466186 A * | 3/2015 | ........ H01M 10/0525 |
| CN | 104979525 A * | 10/2015 | ........ H01M 10/4235 |

(Continued)

OTHER PUBLICATIONS

Kai Liu, et al., "Electrospun core-shell microfiber separator with thermal-triggered flame-retardant properties for lithium-ion batteries", Sci. Adv. 2017;3:e1601978, Jan. 13, 2017, pp. 1-8.

(Continued)

*Primary Examiner* — Sean P Cullen
(74) *Attorney, Agent, or Firm* — Harness, Dickey & Pierce, P.L.C.

(57) ABSTRACT

An electrochemical cell for a lithium battery includes a negative electrode, a positive electrode, a polymeric separator, and composite flame retardant particles including a particulate host material and a flame retardant material carried by the particulate host material. The composite flame retardant particles may be positioned within the electrochemical cell along a lithium-ion transport path or an electron transport path that extends through or between one or more components of the electrochemical cell. The composite flame retardant particles may be positioned within polymeric portions of a laminate structure that defines a housing in which the electrochemical cell is enclosed.

19 Claims, 3 Drawing Sheets

(51) Int. Cl.
*H01M 50/414* (2021.01)
*H01M 50/46* (2021.01)
*H01M 50/446* (2021.01)
*H01M 50/491* (2021.01)
*H01M 4/02* (2006.01)

(52) U.S. Cl.
CPC ......... *H01M 50/446* (2021.01); *H01M 50/46* (2021.01); *H01M 50/491* (2021.01); *H01M 2004/021* (2013.01); *H01M 2004/027* (2013.01); *H01M 2004/028* (2013.01)

(58) Field of Classification Search
USPC ........................................ 429/145, 177, 248
See application file for complete search history.

(56) References Cited

U.S. PATENT DOCUMENTS

| | | | |
|---|---|---|---|
| 9,123,939 B2 | 9/2015 | Xiao et al. |
| 9,160,036 B2 | 10/2015 | Yang et al. |
| 9,252,411 B2 | 2/2016 | Elhamid et al. |
| 9,302,914 B2 | 4/2016 | Liu et al. |
| 9,362,552 B2 | 6/2016 | Sohn et al. |
| 9,373,829 B2 | 6/2016 | Xiao et al. |
| 9,437,871 B2 | 9/2016 | Zhou et al. |
| 9,647,254 B2 | 5/2017 | Dadheech et al. |
| 9,742,028 B2 | 8/2017 | Zhou et al. |
| 9,896,763 B2 | 2/2018 | Dadheech et al. |
| 9,905,847 B2 | 2/2018 | Dadheech et al. |
| 9,923,189 B2 | 3/2018 | Xiao |
| 9,929,435 B2 | 3/2018 | Cai et al. |
| 9,979,008 B2 | 5/2018 | Dai et al. |
| 9,985,284 B2 | 5/2018 | Dadheech et al. |
| 10,084,204 B2 | 9/2018 | Dai et al. |
| 10,128,481 B2 | 11/2018 | Xiao et al. |
| 10,141,559 B2 | 11/2018 | Xiao et al. |
| 10,199,643 B2 | 2/2019 | Zhou et al. |
| 10,312,501 B2 | 6/2019 | Yang et al. |
| 10,326,166 B2 | 6/2019 | Yang et al. |
| 10,367,201 B2 | 7/2019 | Yang et al. |
| 10,381,170 B2 | 8/2019 | Dai et al. |
| 10,396,360 B2 | 8/2019 | Xiao et al. |
| 10,431,849 B2 | 10/2019 | Yersak et al. |
| 10,483,592 B2 | 11/2019 | Xiao et al. |
| 10,573,879 B2 | 2/2020 | Yang et al. |
| 10,615,461 B2 | 4/2020 | Xiao et al. |
| 10,622,627 B2 | 4/2020 | Dadheech et al. |
| 10,629,941 B2 | 4/2020 | Dai et al. |
| 10,629,949 B2 | 4/2020 | Yersak et al. |
| 10,680,281 B2 | 6/2020 | Yersak et al. |
| 10,734,673 B2 | 8/2020 | Yersak et al. |
| 11,101,501 B2 | 8/2021 | Liu et al. |
| 11,239,459 B2 | 2/2022 | Yersak et al. |
| 11,328,878 B2 | 5/2022 | Dai et al. |
| 11,404,698 B2 | 8/2022 | Xu et al. |
| 2014/0265557 A1 | 9/2014 | Huang et al. |
| 2015/0056387 A1 | 2/2015 | Dadheech et al. |
| 2015/0056493 A1 | 2/2015 | Dadheech et al. |
| 2015/0056507 A1 | 2/2015 | Dadheech et al. |
| 2015/0349307 A1 | 12/2015 | Dadheech et al. |
| 2016/0172706 A1 | 6/2016 | Xiao et al. |
| 2016/0172710 A1 | 6/2016 | Liu et al. |
| 2016/0254567 A1* | 9/2016 | Cai ................... H01M 10/0564 429/306 |
| 2017/0271678 A1 | 9/2017 | Yang et al. |
| 2018/0254531 A1* | 9/2018 | Xiao .................. H01M 50/423 |
| 2019/0372155 A1 | 12/2019 | Yersak et al. |
| 2019/0393549 A1 | 12/2019 | Yersak et al. |
| 2020/0395630 A1 | 12/2020 | Yersak et al. |
| 2022/0199970 A1 | 6/2022 | Xiao et al. |

FOREIGN PATENT DOCUMENTS

| | | | | |
|---|---|---|---|---|
| CN | 105742733 A | * | 7/2016 | |
| CN | 108091782 A | * | 5/2018 | ........ H01M 10/0525 |
| CN | 114649498 A | | 6/2022 | |
| DE | 102021111880 A1 | | 6/2022 | |
| WO | WO-2012134202 A2 | * | 10/2012 | ........... A62D 1/0021 |
| WO | WO-201 4182281 A1 | | 11/2014 | |
| WO | WO-2017045573 A1 | | 3/2017 | |

OTHER PUBLICATIONS

Joule, "High-Efficiency Lithium Metal batteries with Fire-Retardant Electrolytes", Aug. 15, 2018, pp. 1548-1558.
Ziqi Zeng, et al., "Safer lithium ion batteries based on nonflammable electrolyte", Journal of Power Sources 279, 2015, pp. 6-12.
Bin Li et al., "Effect of a novel charring-foaming agent on flame retardancy and thermal degradation of intumescent flame retardant polypropylene", Polymer Degradation and Stability 91, 2006, pp. 1380-1386.
Oingguo Meng, et al., "Adsorption of Organophosphates into Microporous and Mesoporous NaX Zeolites and Subsequent Chemistry", Environmental Science 7 Technology, Sep. 19, 2010, 6 pages.
Yun Zhao, et al., "A Comparison on th Hydrothermal Stability of nano-sized H-ZSM-5 Zeolite Modified by Ammonium Dihydrogen Phosphate and Trimenthylphosphate", Catalysis Letters, Apr. 11, 2019, pp. 2169-2179.

* cited by examiner

LITHIUM BATTERY INCLUDING COMPOSITE PARTICLES WITH FLAME RETARDANT MATERIAL CARRIED BY PARTICULATE HOST MATERIAL

INTRODUCTION

The present disclosure relates to secondary lithium batteries, and, more specifically, to materials for enhancing the flame retardant performance of secondary lithium batteries and components thereof.

Secondary lithium-ion batteries and lithium metal batteries are desirable candidates for powering electronic devices in the consumer, automotive, and aerospace industries due to their relatively high energy density, high power density, lack of memory effect, and long cycle life, as compared to other rechargeable battery technologies, including lead-acid batteries, nickel-cadmium and nickel-metal-hydride batteries. The widespread commercialization of lithium batteries, however, is dependent upon their ensured performance under normal operating conditions, in the event of manufacturing defects, upon aging, as well as under a variety of abuse conditions, including exposure to high temperatures, overcharge, over-discharge, and exposure to external forces that physically damage one or more internal components thereof. Conditions that affect the thermal, chemical, electrical, and/or physical stability of lithium batteries may increase the internal temperature of such batteries, which may, in turn, set-off additional undesirable events and/or chemical reactions within the batteries that may lead to additional heat generation. Because components of lithium batteries and/or of their surrounding environment may be flammable, it may be desirable to incorporate materials into the internal components of such batteries that effectively increase the combustion resistance thereof.

SUMMARY

An electrochemical cell for a lithium battery is disclosed. The electrochemical cell may comprise a negative electrode, a positive electrode spaced apart from the negative electrode, a porous polymeric separator disposed between the negative electrode and the positive electrode, and composite flame retardant particles. The negative electrode may include a negative electrode current collector having a major surface and a negative electrode active material layer disposed on the major surface of the negative electrode current collector. The positive electrode may include a positive electrode current collector having a major surface and a positive electrode active material layer disposed on the major surface of the positive electrode current collector. The porous polymeric separator may include a first major surface that faces toward the negative electrode and an opposite second major surface that faces toward the positive electrode. A lithium-ion transport path may extend through the porous polymeric separator between the negative electrode and the positive electrode. A first electron transport path may extend between the negative electrode current collector and the negative electrode active material layer. A second electron transport path may extend between the positive electrode current collector and the positive electrode active material layer. The composite flame retardant particles may be positioned along at least a portion of at least one of (i) the lithium-ion transport path, (ii) the first electron transport path, or (iii) the second electron transport path. The composite flame retardant particles may include a particulate host material and a flame retardant material carried by the particulate host material.

The particulate host material may comprise particles of an inorganic mesoporous material that includes a plurality of open pores. In such case, the flame retardant material may be disposed within the open pores of the inorganic mesoporous material. Each of the composite flame retardant particles may be encapsulated within a shell, and the flame retardant material may be immobilized within the open pores of the inorganic mesoporous material by the shell. The shell may comprise an organic polymeric material.

The particulate host material may comprise particles of at least one of a dehydrated zeolite, activated carbon, silica, alumina, aluminophosphate, molecular sieve, or metal-organic framework.

The particulate host material comprises particles of a lithiated zeolite material.

The flame retardant material may comprise at least one of an organophosphorus compound, an inorganic phosphorus compound, an organohalogen compound, a boron-containing compound, an aluminum-containing compound, or a magnesium-containing compound.

The flame retardant material may be an intumescent material.

The composite flame retardant particles may be positioned within or along at least a portion of the lithium-ion transport path. In one form, the composite flame retardant particles may be embedded in and distributed throughout the porous polymeric separator, between the first major surface and the second major surface thereof. In another form, the composite flame retardant particles may be disposed on the first major surface or the second major surface of the porous polymeric separator.

The composite flame retardant particles may be positioned within or along at least a portion of the first electron transport path or the second electron transport path. In one form, the composite flame retardant particles may be disposed on the major surface of the negative electrode current collector, and the negative electrode active material layer may be disposed on the major surface of the negative electrode current collector over the composite flame retardant particles. Additionally or alternatively, the composite flame retardant particles may be disposed on the major surface of the positive electrode current collector, and the positive electrode active material layer may be disposed on the major surface of the positive electrode current collector over the composite flame retardant particles.

The composite flame retardant particles may exhibit a porosity in a range of 10% to 80% and a mean particle diameter in a range of 50 nanometers to 10 micrometers.

An electrochemical cell for a lithium battery is disclosed. The electrochemical cell may comprise a negative electrode, a positive electrode spaced apart from the negative electrode, a porous polymeric separator disposed between the negative electrode and the positive electrode, and composite flame retardant particles. The negative electrode may include a negative electrode current collector having a major surface and a negative electrode active material layer disposed on the major surface of the negative electrode current collector. The positive electrode may include a positive electrode current collector having a major surface and a positive electrode active material layer disposed on the major surface of the positive electrode current collector. The porous polymeric separator may include a first major surface that faces toward the negative electrode and an opposite second major surface that faces toward the positive electrode. The composite flame retardant particles may include a particulate host material and a flame retardant material carried by the particulate host material. The composite flame retardant particles may be: (i) embedded in and distributed throughout the porous polymeric separator, between the first major surface and the second major surface thereof, (ii) disposed on the first major surface or the second major surface of the porous polymeric separator, (iii) disposed on the major surface of the negative electrode current collector, and the negative electrode active material layer may be disposed on the major surface of the negative electrode current collector over the composite flame retardant particles, or (iv) disposed on the major surface of the positive electrode current collector, and the positive electrode active material layer may be disposed on the major surface of the positive electrode current collector over the composite flame retardant particles.

The particulate host material may comprise particles of an inorganic mesoporous material that includes a plurality of open pores. In such case, the flame retardant material may be disposed within the open pores of the inorganic mesoporous material.

Each of the composite flame retardant particles may be encapsulated within a polymeric shell. In such case, the flame retardant material may be immobilized within the open pores of the inorganic mesoporous material by the polymeric shell.

The particulate host material may comprise particles of at least one of a dehydrated zeolite, lithiated zeolite, activated carbon, silica, alumina, aluminophosphate, molecular sieve, or metal-organic framework.

A lithium battery is disclosed. The lithium battery may comprise a housing defining an interior, a plurality of electrochemical cells hermetically sealed within the interior of the housing, and composite flame retardant particles. The housing may be defined by a laminate structure including a metal foil laminated between a first polymeric sheet and a second polymeric sheet. The composite flame retardant particles may include a particulate host material and a flame retardant material supported on and carried by the host material. The composite flame retardant particles may be distributed throughout the first polymeric sheet and/or the second polymeric sheet of the laminate structure of the housing.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

BRIEF DESCRIPTION OF THE DRAWINGS

Illustrative embodiments will hereinafter be described in conjunction with the appended drawings, wherein like designations denote like elements, and wherein:

FIG. 1 is a schematic side cross-sectional view of an electrochemical cell including composite flame retardant particles, the electrochemical cell includes a negative electrode current collector having a negative electrode active material layer disposed on a major surface thereof, a positive electrode current collector having a positive electrode active material layer formed on a major surface thereof, and a porous polymeric separator disposed between the negative and positive electrode active material layers, the composite flame retardant particles are dispersed throughout the polymeric separator and deposited as discrete layers on the major surface of the negative electrode current collector, the major surface of the positive electrode current collector, and on opposite first and second major surfaces of the polymeric separator;

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

The presently disclosed composite flame retardant particles may be incorporated into one or more components of an electrochemical cell of a lithium battery to help improve the performance of the battery, for example, by circumventing conditions that may lead to overheating, thermal runaway, and/or by suppressing or terminating combustion reactions within the battery. The composite flame retardant particles include a particulate host material and a flame retardant material supported on and carried by the particulate host material. The particulate host material may comprise a mesoporous material that includes a plurality of open pores, and the flame retardant material may be disposed within the open pores of the particulate host material. After the flame retardant material is introduced into the open pores of the particulate host material, each of the host material particles may be encapsulated in a polymeric shell, which may immobilize the flame retardant material within the open pores of the particulate host material until environmental conditions within the battery activate the particles, for example, by decomposing the polymeric shell. The composite flame retardant particles may be incorporated into one or more components of the electrochemical cell, for example, by being coated on one or more surfaces of a polymeric separator, by being distributed throughout the polymeric separator, by being disposed between a surface of a negative and/or positive electrode current collector and an overlying layer of a negative and/or positive electrode active material, and/or by being incorporated into a housing in which the electrochemical cells of the lithium battery are enclosed.

In embodiments where the particulate host material comprises a lithiated zeolite, the composite flame retardant particles also may help prevent or mitigate degradation of various components of the electrochemical cell, for example, by trapping or inhibiting the movement of water molecules, hydrogen ions, hydrofluoric acid (HF), and/or transition metal ions, such as $Mn^{2+}$, $Ni^{2+/4+}$, and/or $Fe^{2+/3+}$ ions, in the electrochemical cell, which may help improve the life and cycle performance of the battery. The term "lithiated zeolite" means a zeolite that has been ion-exchanged with lithium ions such that a plurality of lithium ions are present within the zeolite as free ions and/or as extra-framework ions. Methods of preparing dehydrated lithiated zeolite particles and incorporating dehydrated lithiated zeolite particles into one or more components of an electrochemical cell of a lithium battery are disclosed in commonly owned U.S. Pat. Nos. 10,483,592 and 10,615,461, each incorporated herein by reference in its entirety.

Figure 1:
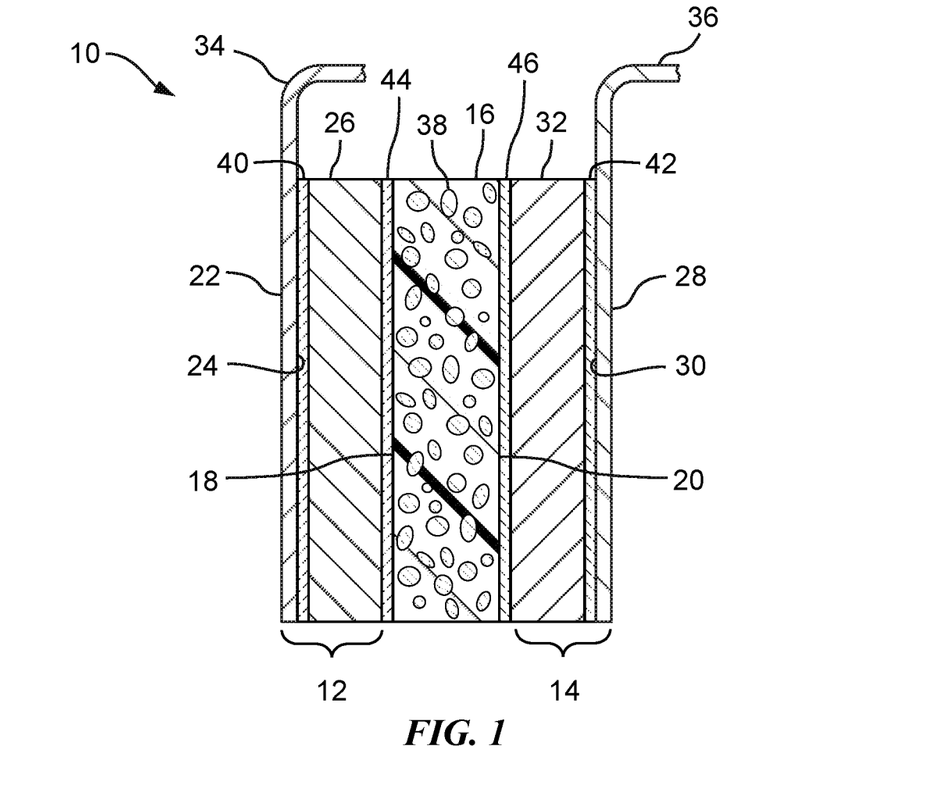

FIG. 1 is a schematic depiction of an electrochemical cell 10 that includes composite flame retardant particles 38 positioned along a lithium-ion transport path and along an electron transport path through the electrochemical cell 10. The electrochemical cell 10 includes a negative electrode 12, a positive electrode 14 spaced apart from the negative electrode 12, and a polymeric separator 16 disposed between the negative and positive electrodes 12, 14 and including a first major surface 18 that faces toward the negative electrode 12 and an opposite second major surface 20 that faces toward the positive electrode 14. The negative electrode 12 includes a negative electrode current collector 22 having a major surface 24 that faces toward the polymeric separator 16 and a negative electrode active material layer 26 disposed on the major surface 24 of the negative electrode current collector 22. The positive electrode 14 includes a positive electrode current collector 28 having a major surface 30 that faces toward the polymeric separator 16 and a positive electrode active material layer 32 formed on the major surface 30 of the positive electrode current collector 28. The negative and positive electrodes 12, 14 are spaced apart from one another and are physically separated and electrically isolated from one another by the polymeric separator 16.

The negative electrode active material layer 26, the positive electrode active material layer 32, and the polymeric separator 16 are porous and, in assembly, the negative and positive electrode active material layers 26, 32 and the polymeric separator 16 are infiltrated and/or wet with an ionically conductive and electrically insulating electrolyte (not shown). The electrolyte provides a medium for the transport of lithium ions through the polymeric separator 16 and between the negative and positive electrode active material layers 26, 32. These regions of the electrochemical cell 10 through which lithium ions can travel during operation of the electrochemical cell 10 together make-up a lithium-ion transport path within the electrochemical cell 10 that extends through the polymeric separator 16 and between the negative and positive electrode active material layers 26, 32.

Figure 2:
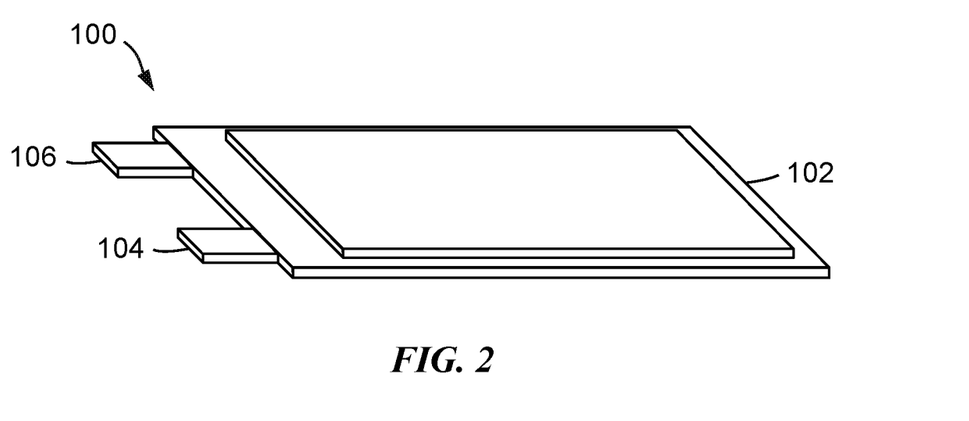
FIG. 2 is a schematic perspective view of a secondary lithium battery pack including a housing with multiple electrochemical cells hermetically sealed within an interior of the housing, wherein composite flame retardant particles are incorporated into a laminate structure that defines the housing and/or into one or more components of the electrochemical cells sealed within the housing.

Referring now to FIGS. 1 and 2, in practice, the electrochemical cell 10 may be combined with and electrically coupled to one or more other electrochemical cells (not shown) to form a secondary lithium-based battery 100, sometimes referred to as a battery pack. In the battery 100, the electrochemical cell 10 may be hermetically sealed within a housing in the form of a flexible pouch 102. In other embodiments, the electrochemical cell 10 may be hermetically sealed within a different type of housing, e.g., a cylindrical, prismatic, or button cell housing (not shown). In the pouch 102, a free end 34 of the negative electrode current collector 22 may be electrically coupled to a proximal end of a negative terminal 104 with a distal end that extends outside of the flexible pouch 102. At the same time, a free end 36 of the positive electrode current collector 28 may be electrically coupled to a proximal end of a positive terminal 106 having a distal end that extends outside of the flexible pouch 102. In practice, the negative terminal 104 may be electrically coupled to the positive terminal 106 via an external circuit (not shown). Such an arrangement provides an electrically conductive pathway for the transport of electrons between the negative and positive electrode active material layers 26, 32 while lithium ions simultaneously travel through the polymeric separator 16 via the electrolyte between the negative electrode active material layer 26 and the opposing positive electrode active material layer 32 during operation of the electrochemical cell 10.

The electrically conductive pathway defined between the negative electrode current collector 22 and the negative electrode active material layer 26 of the electrochemical cell 10 may be referred to herein as a first electron transport path within the electrochemical cell 10, and the electrically conductive pathway defined between the positive electrode current collector 28 and the positive electrode active material layer 32 of the electrochemical cell 10 may be referred to herein as a second electron transport path within the electrochemical cell 10.

The composite flame retardant particles 38 include a particulate host material and a flame retardant material supported on and carried by the particulate host material. Upon exposure to certain high-temperature conditions within the battery 100, the composite flame retardant particles 38 are configured to transition from a passive state to an active state in which the flame retardant material of the composite flame retardant particles 38 undergoes certain chemical reactions and/or experiences certain physical changes that help stabilize thermodynamic conditions within the battery 100. Without intending to be bound by theory, it is believed that when the internal temperature of a lithium battery rises above a threshold temperature (e.g., greater than about 65° C. or, in some instances, greater than about 130° C.), components of the battery 100 may thermally decompose and/or chemically react with one another, leading to the release of various gaseous compounds and the generation of additional heat within the battery 100. In some situations, these initial reactions and increased heating of the battery 100 may set-off additional undesirable events and/or chemical reactions within the battery 100. The flame retardant material of the composite flame retardant particles 38 is configured to thwart the occurrence and/or propagation of these additional undesirable events and/or chemical reactions.

The flame retardant material may be configured, upon heating, to promote the in situ formation of a layer of solid non-volatile carbonaceous material referred to as "char" on the surface of certain carbon-based components of the battery 100, e.g., on the polymeric separator 16. The formation of a layer of carbonaceous char on the surface of such carbon-based components (e.g., on the surface(s) 18, 20 of the polymeric separator 16) may suppress further combustion reactions and burning of the carbon-based components. This is particularly true in embodiments where the flame retardant material is an intumescent material, i.e., a material that swells or increases in volume upon heating. Intumescent flame retardant materials may inhibit further combustion reactions from occurring within the battery 100, for example, by creating a void or highly porous thermally insulating barrier around or over certain components of the battery 100, which may slow heat transfer within the battery 100 and also may prevent the propagation of combustion reactions within the battery 100. In some embodiments, composite flame retardant particles 38 including an intumescent flame retardant material may be positioned within the electrochemical cell 10 so that, upon heating, the intumescent flame retardant material will increase in volume and effectively interrupt or break an existing lithium ion or electron transport path within the electrochemical cell 10, thereby preventing further discharge or recharge of the electrochemical cell 10. Additionally or alternatively, the flame retardant material may be configured, upon heating, to react with certain gases (e.g., $H^+$ and/or $OH^-$) generated in the battery 100, for example, due to decomposition and/or combustion of the electrolyte, to reduce the chemical reactivity of such gases and thereby inhibit further propagation of the radical oxidation reactions of combustion.

Flame retardant materials exhibiting one or more of the above-described attributes include organophosphorus compounds, inorganic phosphorus compounds, organohalogen compounds, boron-containing compounds, aluminum-containing compounds, and/or magnesium-containing compounds. Flame retardant organophosphorus compounds include organophosphates including triphenyl phosphate, resorcinol bis(diphenylphosphate), bisphenol A diphenyl phosphate, and/or tricresyl phosphate (TCP); phosphonates including dimethyl methylphosphonate; phosphinates including aluminium diethyl phosphinate; and/or halogenated organophosphates including tris(2,3-dibromopropyl) phosphate (brominated tris) and chlorinated organophosphates (e.g., tris(1,3-dichloro-2-propyl)phosphate and/or tetrakis(2-chlorethyl)dichloroisopentyldiphosphate). Flame retardant inorganic phosphorus compounds include red phosphorus. Flame retardant organohalogen compounds include organochlorines including chlorendic acid derivatives and/or chlorinated paraffins; and/or organobromines including decabromodiphenyl ether, decabromodiphenyl ethane, polymeric brominated compounds (e.g., brominated polystyrenes), brominated carbonate oligomers, brominated epoxy oligomers, tetrabromophthalic anyhydride, and/or tetrabromobisphenol A and/or hexabromocyclododecane. Flame retardant boron-containing compounds include borates including zinc borate, barium borate, sodium borate, and/or ammonium fluoroborate.

The particulate host material is configured to support and carry the flame retardant material so that the flame retardant material can be incorporated into the electrochemical cell 10 in a manner that does not interfere with normal operations of the electrochemical cell 10 and also allows the flame retardant material to be available to assist in stabilizing thermodynamic conditions within the battery 100, for example, when the battery 100 is heated above a threshold temperature. The particulate host material also may assist and/or work synergistically with the flame retardant material in suppressing chemical reactions within the battery 100 that may lead to heat generation. For example, the particulate host material may be configured to assist in or catalyze the formation of a layer of carbonaceous char on one or more carbon-based components of the battery 100 (e.g., on the polymeric separator 16). The particulate host material also may help stabilize the carbonaceous char after formation thereof and may help maintain a thermally insulating barrier around and/or over the carbon-based components of the battery 100, which may further inhibit heat and mass transfer within the battery 100 and also may prevent or slow the propagation of combustion reactions within the battery 100, for example, by inhibiting or stopping the movement of gaseous reactants or reaction products through the battery 100.

The particulate host material may comprise a porous inorganic material having a three-dimensional network of interconnected open pores and the flame retardant material may be supported on and/or carried by the particulate host material. The flame retardant material may be supported on and/or carried by the particulate host material, for example, by being disposed within the open pores of the particulate host material and/or by being physically or chemically bonded to the particulate host material. The particulate host material may exhibit a crystalline or at least partially crystalline structure.

The particulate host material may comprise an inorganic mesoporous material having open pores with diameters in a range of 2 nanometers to 50 nanometers. The open pores of the particulate host material may be configured to adsorb and store one or more of the flame retardant material compounds therein. The flame retardant material compounds may be stored in the open pores of the particulate host material in a passive state in which the flame retardant material compounds do not interact with other components of the electrochemical cell 10. But, upon exposure to certain high-temperature conditions within the battery 100, the composite flame retardant particles 38 may transition from the passive state to an active state in which the flame retardant material compounds stored in the open pores of the particulate host material are available to react with other components of the electrochemical cell 10 to help thwart the occurrence and/or propagation of undesirable chemical reactions within the electrochemical cell 10. The particulate host material may exhibit a porosity in a range of 10% to 80% and may comprise particles having a mean particle diameter in a range of 50 nanometers to 10 micrometers.

Particulate host materials exhibiting one or more of the above-described attributes include dehydrated natural and/or synthetic zeolites, activated carbon, silica, alumina, aluminophosphates, molecular sieves (e.g., mesoporous molecular sieves), MCM-type materials, metal-organic frameworks, and combinations thereof.

Zeolites are porous crystalline aluminosilicate materials comprising a three-dimensional framework of $AlO_2$ and $SiO_2$ tetrahedral units and extra-framework cations. The tetrahedral units are cross-linked by the sharing of oxygen atoms. Each $AlO_2$ unit introduces one negative charge to the framework, which is offset by the extra-framework cations.

The extra-framework cations may be organic or inorganic in nature. In embodiments where the particulate host material is made of a zeolite, the zeolite may comprise a lithium ion-exchanged zeolite material including a three-dimensional framework of $AlO_2$ and $SiO_2$ tetrahedral units and extra-framework lithium cations ($Li^+$). The amount of extra-framework lithium cations present in the lithium ion-exchanged zeolite material will at least partially depend on the Si:Al ratio of the specific zeolite material and the cation exchange capacity (CEC) of the zeolite material. In embodiments where the particulate host material is made of a lithium ion-exchanged zeolite, lithium cations ($Li^+$) may comprise greater than 90% of the extra-framework cations in the zeolite, greater than 95% of the extra-framework cations, or greater than 99% of the extra-framework cations. The lithium ion-exchanged zeolite may be substantially free of any and/or all of the following extra-framework cations: $Na^+$ and $H^+$.

The crystal structures of zeolites (and other molecular sieves) include interstitial spaces (or cages) of molecular dimensions. As such, when dehydrated, zeolites may be used as adsorbents to selectively adsorb molecules by retaining the molecules within their interstitial spaces. Access to the interstitial spaces within a zeolite is provided by pore openings (or channels) in the crystal lattice of the zeolite, which are defined by rings of interconnected oxygen (O), silicon (Si), and/or aluminum (Al) atoms. The size and shape of these pore openings limit the size and shape of the molecules that can be adsorbed by the zeolite and are determined, at least in part, by the number of tetrahedral units (or, alternatively, oxygen atoms) that make up the rings and by the type of extra-framework cations present within the zeolite. Zeolites having pore openings defined by 8-membered rings typically have relatively small pore openings with diameters or widths in the range of 3 angstroms to 4.5 angstroms. Zeolites having pore openings defined by 10-membered rings typically have medium pore openings with diameters or widths in the range of 4.5 angstroms to 6 angstroms. Zeolites having pore openings defined by 12-membered rings typically have relatively large pore openings with diameters or widths in the range of 6 angstroms to 8 angstroms. Zeolites and other molecular sieves may be intentionally formed with pore openings exhibiting different geometries and/or different dimensions, e.g., larger diameters, for example, using various templating techniques, as known in the art.

The lithium ion-exchanged zeolite material may have pore openings configured to adsorb one or more of the above-described flame retardant material compounds. For example, the lithium ion-exchanged zeolite material may have pore openings larger than the ionic radius of the flame retardant material compounds. In embodiments, the lithium ion-exchanged zeolite material may have pore openings with widths or diameters in the range of 3 angstroms to 7 angstroms. Zeolite materials having pore openings with widths or diameters in the range of 3 angstroms to 7 angstroms may include zeolite materials having pore openings defined by 8-membered, 9-membered, 10-membered, and/or 12-membered rings.

Each of the particles of the composite flame retardant particles 38 may be encapsulated in a shell. The shell may be configured to immobilize the flame retardant material within the open pores of particulate host material and retain the flame retardant material in a passive state until environmental conditions within the battery 100 are sufficient to transition the composite flame retardant particles 38 from the passive state to an active state. The composite flame retardant particles 38 may be configured to transition to an active state, for example, when the battery 100 is heated above a threshold temperature. For example, when the battery 100 is heated to a temperature at or above the threshold temperature, the shell surrounding the composite flame retardant particles 38 may decompose, thereby releasing the flame retardant material from the open pores of particulate host material and/or by allowing the flame retardant material compounds to react with other materials in the battery 100.

In embodiments where the particles of the composite flame retardant particles 38 are encapsulated in a shell, the shell may comprise a polymeric material that may decompose or melt when heated at or above a threshold temperature. The polymeric material of the shell may comprise a polyolefin or a combination of polyolefins, e.g., polyethylene (PE), polypropylene (PP), polyamide (PA), poly(tetrafluoroethylene) (PTFE), polyvinylidene fluoride (PVdF), and/or poly(vinyl chloride) (PVC).

The composite flame retardant particles 38 may be positioned within or along the lithium-ion transport path and/or the first or second electron transport paths through the electrochemical cell 10. For example, as shown in FIG. 1, the composite flame retardant particles 38 may be dispersed throughout the polymeric separator 16. Additionally or alternatively, the composite flame retardant particles 38 may be incorporated into the electrochemical cell 10 by being deposited as a discrete layer on one or more components of the electrochemical cell 10. For example, the composite flame retardant particles 38 may be deposited as a discrete layer 40 on the major surface 24 of the negative electrode current collector 22, as a discrete layer 42 on the major surface 30 of the positive electrode current collector 28, as a discrete layer 44 on the first major surface 18 of the polymeric separator 16, and/or as a discrete layer 46 on the second major surface 20 of the polymeric separator 16.

Figure 3:
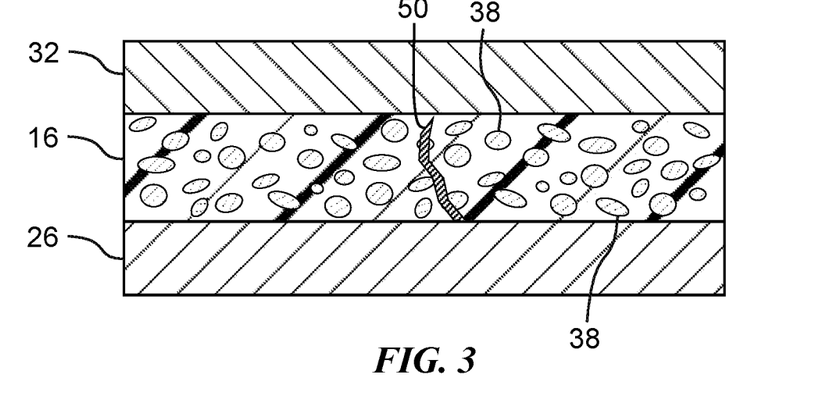
FIG. 3 is a schematic side cross-sectional view of a portion of the electrochemical cell of FIG. 1 depicting the negative electrode active material layer, the positive electrode active material layer, and the porous polymeric separator disposed therebetween, wherein the composite flame retardant particles distributed throughout the porous polymeric separator comprise an intumescent flame retardant material.
Figure 4:
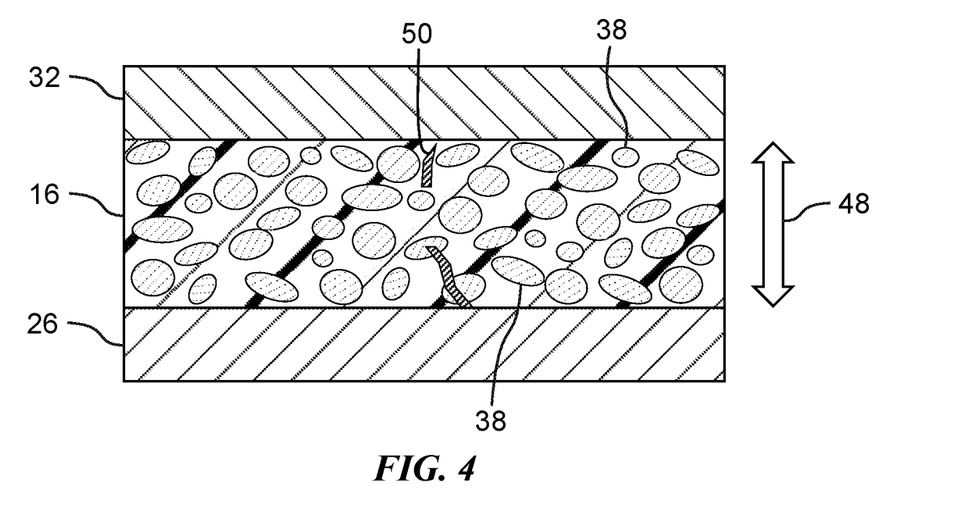
FIG. 4 is a schematic side cross-sectional view of the electrochemical cell of FIG. 3 after activation of the composite flame retardant particles and swelling of the intumescent flame retardant material.

Referring now to FIGS. 3 and 4, in embodiments where the composite flame retardant particles 38 are dispersed throughout the polymeric separator 16, the composite flame retardant particles 38 may comprise an intumescent flame retardant material. In such case, when the battery 100 is heated to a temperature at or above a threshold temperature, the composite flame retardant particles 38 may swell, for example, in the direction of the arrows 48 and effectively break the lithium-ion transport path through the separator 16. In embodiments where a lithium dendrite 50 has formed between the negative electrode active material layer 26 and the positive electrode active material layer 32 and may have created an internal short circuit within the electrochemical cell 10, the composite flame retardant particles 38 may swell in the direction of the arrows 48 and effectively break the lithium dendrite 50. Breaking the lithium dendrite 50 may effectively destroy the internal short circuit within the electrochemical cell 10 and stop further heating of the electrochemical cell 10 resulting from the internal short circuit.

Figure 5:
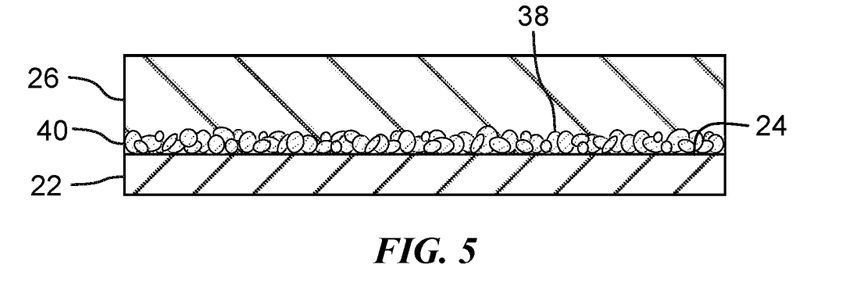
FIG. 5 is a schematic side cross-sectional view of a portion of the electrochemical cell of FIG. 1 depicting the (negative or positive electrode) current collector, a layer of composite flame retardant particles disposed on a major surface of the current collector, and a (negative or positive electrode) active material layer disposed on the major surface of the current collector over the layer of composite flame retardant particles, wherein the composite flame retardant particles comprise an intumescent flame retardant material.
Figure 6:
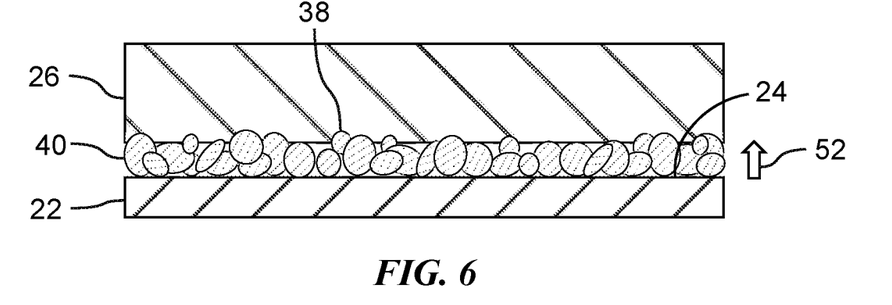
FIG. 6 is a schematic side cross-sectional view of the electrochemical cell of FIG. 5 after activation of the composite flame retardant particles and swelling of the intumescent flame retardant material.

Referring now to FIGS. 5 and 6, in embodiments where the composite flame retardant particles 38 have been deposited as a discrete layer 40 on the major surface 24 of the negative electrode current collector 22 (or as a discrete layer 42 on the major surface 30 of the positive electrode current collector 28), the composite flame retardant particles 38 may comprise an intumescent flame retardant material. In such case, when the battery 100 is heated to a temperature at or above a threshold temperature, the composite flame retardant particles 38 may swell, for example, in the direction of the arrow 52 and lift at least a portion of the negative electrode active material layer 26 away from the major surface 24 of the negative electrode current collector 22, effectively breaking the first electron transport path between the negative electrode current collector 22 and the negative electrode active material layer 26 in the electrochemical cell 10. Likewise, when the composite flame retardant particles 38 are deposited as a discrete layer 42 on the major surface 30 of the positive electrode current collector 28, when the battery 100 is heated to a temperature at or above a threshold temperature, the composite flame retardant particles 38 may swell and lift at least a portion of the positive electrode active material layer 32 away from the major surface 30 of the positive electrode current collector 28, effectively breaking the second electron transport path between the positive electrode current collector 28 and the positive electrode active material layer 32 in the electrochemical cell 10.

Figure 7:
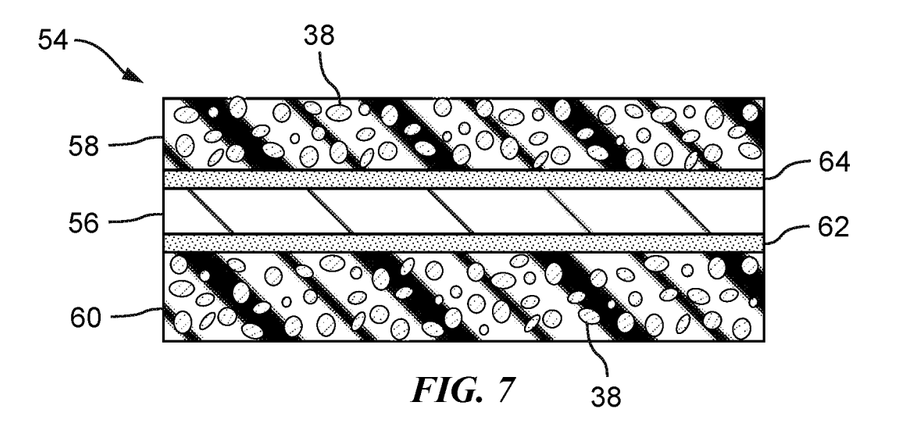
FIG. 7 is a schematic side cross-sectional view of a portion of the housing of FIG. 2 depicting the laminate structure of the housing, wherein the composite flame retardant particles are distributed throughout first and second polymeric sheets of the laminate structure of the housing.

Referring now to FIG. 7, in some embodiments, the composite flame retardant particles 38 may be incorporated into the flexible pouch 102 (FIG. 2) in which the electrochemical cell 10 is hermetically sealed. For example, the flexible pouch 102 may be in the form of a laminate structure 54 including a metal foil 56 (e.g., an aluminum foil) laminated between a first polymeric sheet 58 and a second polymeric sheet 60. The first and second polymeric sheets 58, 60 may be respectively bonded to first and second sides of the metal foil 56 by a first adhesive layer 62 and a second adhesive layer 64. In such case, the composite flame retardant particles 38 may be incorporated into the flexible pouch 102 of the battery 100 by being distributed throughout the first polymeric sheet 58 and/or the second polymeric sheet 60. In such case, when the battery 100 is heated to a temperature at or above a threshold temperature, the composite flame retardant particles 38 may help prevent or inhibit heat transfer from the battery 100 to the surrounding environment, for example, to adjacent batteries (not shown), and also may help prevent or inhibit the propagation of combustion reactions from the battery 100 to the surrounding environment.

The polymeric separator 16 may comprise a non-woven material, e.g., a manufactured sheet, web, or matt of directionally or randomly oriented fibers. The polymeric separator 16 may comprise a microporous polymeric material, e.g., a microporous polyolefin-based membrane or film. For example, the polymeric separator 16 may comprise a single polyolefin or a combination of polyolefins, such as polyethylene (PE), polypropylene (PP), polyamide (PA), poly(tetrafluoroethylene) (PTFE), polyvinylidene fluoride (PVdF), and/or poly(vinyl chloride) (PVC). In one form, the polymeric separator 16 may comprise a laminate of one or more polymeric materials, such as a laminate of PE and PP.

The negative and positive electrode current collectors 22, 28 may comprise a material that is capable of collecting and reversibly passing free electrons to and from their respective electrode active material layers 26, 32. For example, the negative and/or positive electrode current collectors 22, 28 may comprise an electrically conductive metal, e.g., a transition metal or alloy thereof. In embodiments, the negative electrode current collector 22 may comprise copper, nickel, an iron alloy (e.g., stainless steel), or titanium, and the positive electrode current collector 28 may comprise aluminum, nickel, or an iron alloy (e.g., stainless steel). Other electrically conductive metals may of course be used, if desired.

The negative electrode active material layer 26 may comprise a layer of lithium metal or an electrochemically active intercalation host material. In embodiments where the negative electrode active material layer 26 comprises a lithium metal layer, lithium metal layer may comprise a lithium metal alloy or may consist essentially of lithium (Li) metal. For example, the lithium metal layer may comprise, by weight, greater than 97% lithium or, more preferably, greater than 99% lithium. Some examples of intercalation host materials for the electrochemically active material of the negative electrode active material layer 26 include carbon-based materials (e.g., graphite, activated carbon, carbon black, and graphene), lithium, lithium-based materials, silicon, silicon-based alloys or composite materials, tin oxide, aluminum, indium, zinc, germanium, silicon oxide, titanium oxide, lithium titanate, and combinations thereof. In embodiments where the negative electrode active material layer 26 comprises an electrochemically active intercalation host material, the intercalation host material may be intermingled with a polymeric binder to provide the negative electrode active material layer 26 with structural integrity. Examples of polymeric binders include polyvinylidene fluoride (PVdF), ethylene propylene diene monomer (EPDM) rubber, styrene butadiene rubber (SBR), carboxymethyl cellulose (CMC), polyacrylic acid, and mixtures thereof. The negative electrode active material layer 26 optionally may include particles of an electrically conductive material, which may comprise very fine particles of, for example, high-surface area carbon black.

The positive electrode active material layer 32 may comprise an electrochemically active material that can undergo a reversible redox reaction with lithium at a higher electrochemical potential than the material of the negative electrode active material layer 26 such that an electrochemical potential difference exists between the negative and positive electrode active material layers 26, 32. For example, the positive electrode active material layer 32 may comprise a material that can sufficiently undergo lithium intercalation and deintercalation, alloying and dealloying, or plating and stripping. In one form, the positive electrode active material layer 32 may comprise an intercalation host material that can undergo the reversible insertion or intercalation of lithium ions. In such case, the intercalation host material of the positive electrode active material layer 32 may comprise a layered oxide represented by the formula $LiMeO_2$, an olivine-type oxide represented by the formula $LiMePO_4$, a spinel-type oxide represented by the formula $LiMe_2O_4$, a tavorite represented by one or both of the following formulas $LiMeSO_4F$ or $LiMePO_4F$, or a combination thereof, where Me is a transition metal (e.g., Co, Ni, Mn, Fe, Al, V, or a combination thereof). In another form, the positive electrode active material layer 32 may comprise a conversion material including a component that can undergo a reversible electrochemical reaction with lithium, in which the component undergoes a phase change or a change in crystalline structure accompanied by a change in oxidation state. In such case, the conversion material of the positive electrode active material layer 32 may comprise sulfur, selenium, tellurium, iodine, a halide (e.g., a fluoride or chloride), sulfide, selenide, telluride, iodide, phosphide, nitride, oxide, oxysulfide, oxyfluoride, sulfur-fluoride, sulfur-oxyfluoride, or a lithium and/or metal compound thereof. Examples of suitable metals for inclusion in the conversion material of the positive electrode active material layer 32 include iron, manganese, nickel, copper, and cobalt. In embodiments, the electrochemically active material of the positive electrode active material layer 32 may be intermingled with a polymeric binder to provide the positive electrode active material layer 32 with structural integrity. Examples of polymeric binders include polyvinylidene fluoride (PVdF), ethylene propylene diene monomer (EPDM) rubber, styrene butadiene rubber (SBR), carboxymethyl cellulose (CMC), polyacrylic acid, and mixtures thereof. The positive electrode active material layer 32 optionally may include particles of an electrically conductive material, which may comprise very fine particles of, for example, high-surface area carbon black.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. A lithium battery comprising:
   a housing defining an interior, the housing being defined by a laminate structure including a metal foil laminated between a first polymeric sheet and a second polymeric sheet;
   a plurality of electrochemical cells hermetically sealed within the interior of the housing; and
   composite flame retardant particles including:
      a particulate host material consisting of particles of at least one of a zeolite or aluminophosphate and a plurality of open pores having diameters in a range of 2 nanometers to 50 nanometers; and
      a flame retardant material disposed within the open pores of the particulate host material,
   wherein the composite flame retardant particles are distributed throughout at least one of the first polymeric sheet or the second polymeric sheet of the laminate structure of the housing.

2. An electrochemical cell for a lithium battery, the electrochemical cell comprising:
   a negative electrode including a negative electrode current collector having a major surface and a negative electrode active material layer disposed on the major surface of the negative electrode current collector;
   a positive electrode spaced apart from the negative electrode, the positive electrode including a positive electrode current collector having a major surface and a positive electrode active material layer disposed on the major surface of the positive electrode current collector;
   a porous polymeric separator disposed between the negative electrode and the positive electrode and including a first major surface that faces toward the negative electrode and an opposite second major surface that faces toward the positive electrode;
   a lithium-ion transport path extending through the porous polymeric separator between the negative electrode and the positive electrode;
   a first electron transport path extending between the negative electrode current collector and the negative electrode active material layer;
   a second electron transport path extending between the positive electrode current collector and the positive electrode active material layer; and
   composite flame retardant particles positioned along at least a portion of at least one of (i) the lithium-ion transport path, (ii) the first electron transport path, or (iii) the second electron transport path,
   wherein the composite flame retardant particles include:
      a particulate host material consisting of particles of at least one of a zeolite or aluminophosphate and a plurality of open pores having diameters in a range of 2 nanometers to 50 nanometers; and
      a flame retardant material disposed within the open pores of the particulate host material.

3. The electrochemical cell of claim 2 wherein the particulate host material consists of particles of a lithiated zeolite material.

4. The electrochemical cell of claim 2 wherein the flame retardant material comprises at least one of an organophosphorus compound, an inorganic phosphorus compound, an organohalogen compound, a boron-containing compound, an aluminum-containing compound, or a magnesium-containing compound.

5. The electrochemical cell of claim 2 wherein the flame retardant material is an intumescent material.

6. The electrochemical cell of claim 2 wherein the composite flame retardant particles are positioned within or along at least a portion of the first electron transport path or the second electron transport path.

7. The electrochemical cell of claim 2 wherein the composite flame retardant particles are disposed on the major surface of the negative electrode current collector, and wherein the negative electrode active material layer is disposed on the major surface of the negative electrode current collector over the composite flame retardant particles.

8. The electrochemical cell of claim 2 wherein the composite flame retardant particles are disposed on the major surface of the positive electrode current collector, and wherein the positive electrode active material layer is disposed on the major surface of the positive electrode current collector over the composite flame retardant particles.

9. The electrochemical cell of claim 2 wherein the composite flame retardant particles exhibit a porosity in a range of 10% to 80% and a mean particle diameter in a range of 50 nanometers to 10 micrometers.

10. The electrochemical cell of claim 2 wherein the flame retardant material comprises at least one organohalogen compound selected from the group consisting of tris(2,3-dibromopropyl)phosphate, tris(1,3-dichloro-2-propyl)phosphate, tetrakis(2-chloroethyl)dichloroisopentyldiphosphate, decabromodiphenyl ethane, brominated polystyrenes, brominated carbonate oligomers, brominated epoxy oligomers, tetrabromophthalic anhydride, tetrabromobisphenol A, and hexabromocyclododecane.

11. The electrochemical cell of claim 2 wherein the flame retardant material comprises at least one boron-containing compound selected from the group consisting of sodium borate and ammonium fluoroborate.

12. The electrochemical cell of claim 2 wherein the composite flame retardant particles are positioned within or along at least a portion of the lithium-ion transport path.

13. The electrochemical cell of claim 12 wherein the composite flame retardant particles are embedded in and distributed throughout the porous polymeric separator, between the first major surface and the second major surface thereof.

14. The electrochemical cell of claim 12 wherein the composite flame retardant particles are disposed on the first major surface or the second major surface of the porous polymeric separator.

15. The electrochemical cell of claim 2 wherein each of the composite flame retardant particles is encapsulated within a shell, and wherein the flame retardant material is immobilized within the open pores of the particulate host material by the shell.

16. The electrochemical cell of claim 15 wherein the shell comprises an organic polymeric material.

17. The electrochemical cell of claim 16 wherein the organic polymeric material comprises at least one of a polyamide and a polyvinyl chloride.

18. An electrochemical cell for a lithium battery, the electrochemical cell comprising:
   a negative electrode including a negative electrode current collector having a major surface and a negative electrode active material layer disposed on the major surface of the negative electrode current collector;
   a positive electrode spaced apart from the negative electrode, the positive electrode including a positive electrode current collector having a major surface and a positive electrode active material layer disposed on the major surface of the positive electrode current collector;
   a porous polymeric separator disposed between the negative electrode and the positive electrode and including a first major surface that faces toward the negative electrode and an opposite second major surface that faces toward the positive electrode; and
   composite flame retardant particles including:
      a particulate host material consisting of particles of at least one of a zeolite or aluminophosphate and a plurality of open pores having diameters in a range of 2 nanometers to 50 nanometers; and
      a flame retardant material disposed within the open pores of the particulate host material,
   wherein the composite flame retardant particles are:
   (i) embedded in and distributed throughout the porous polymeric separator, between the first major surface and the second major surface thereof,
   (ii) disposed on the first major surface or the second major surface of the porous polymeric separator,
   (iii) disposed on the major surface of the negative electrode current collector, and wherein the negative electrode active material layer is disposed on the major surface of the negative electrode current collector over the composite flame retardant particles, or
   (iv) disposed on the major surface of the positive electrode current collector, and wherein the positive electrode active material layer is disposed on the major surface of the positive electrode current collector over the composite flame retardant particles.

19. The electrochemical cell of claim 18 wherein each of the composite flame retardant particles is encapsulated within a polymeric shell, and wherein the flame retardant material is immobilized within the open pores of the particulate host material by the polymeric shell.

* * * * *